Figure 1:
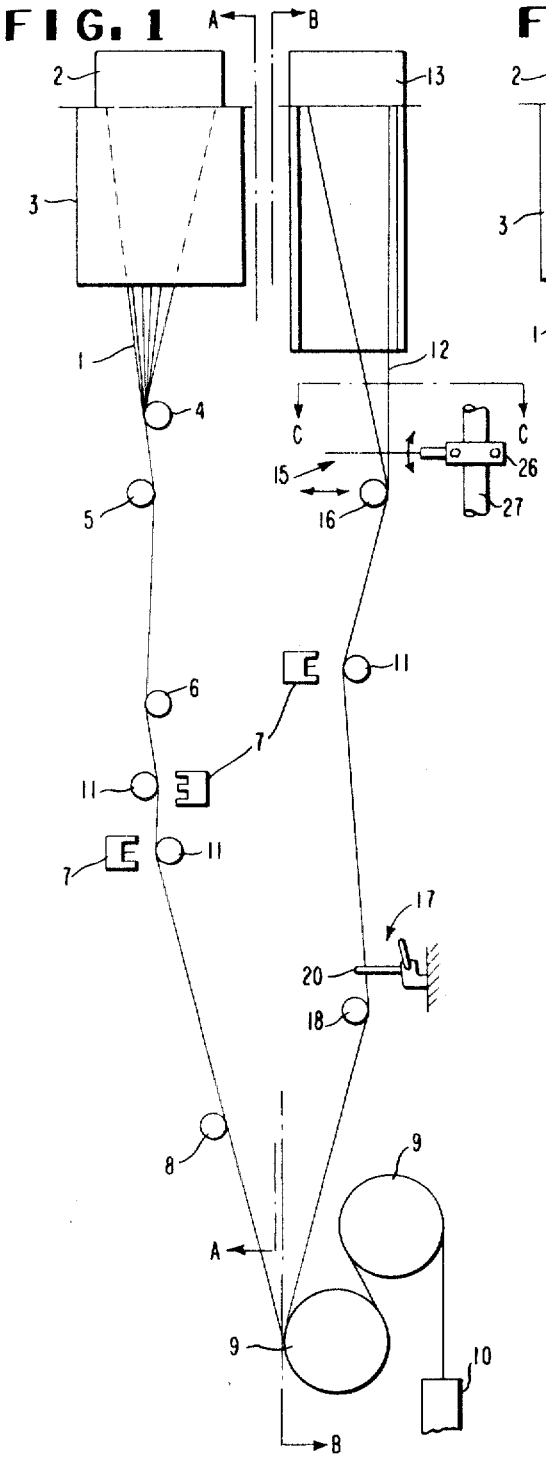
Figure 2:
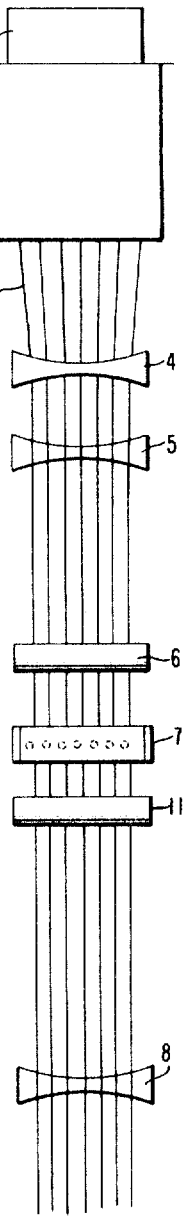
Figure 3:
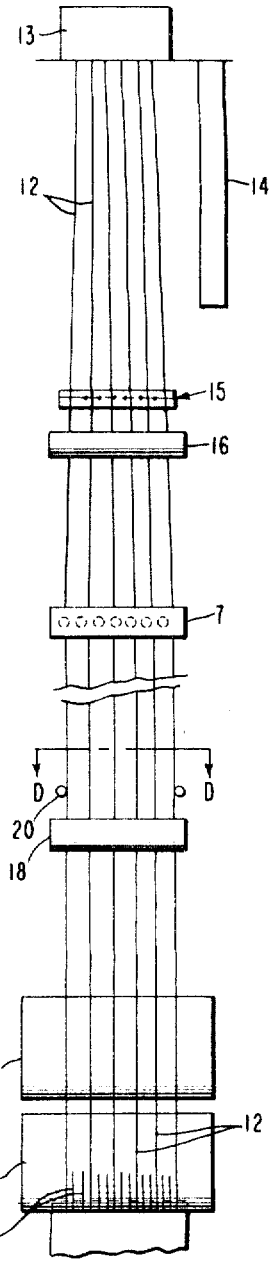
Figure 4:
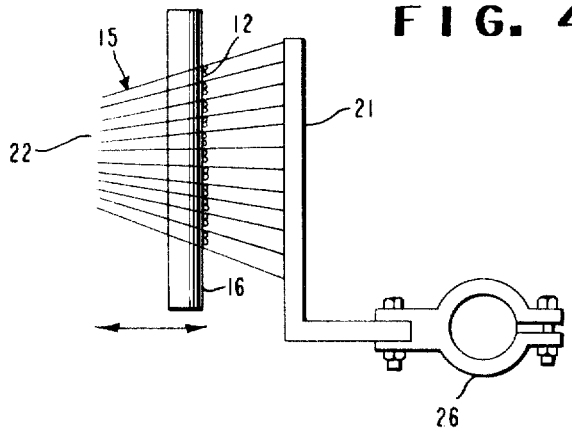
Figure 5:
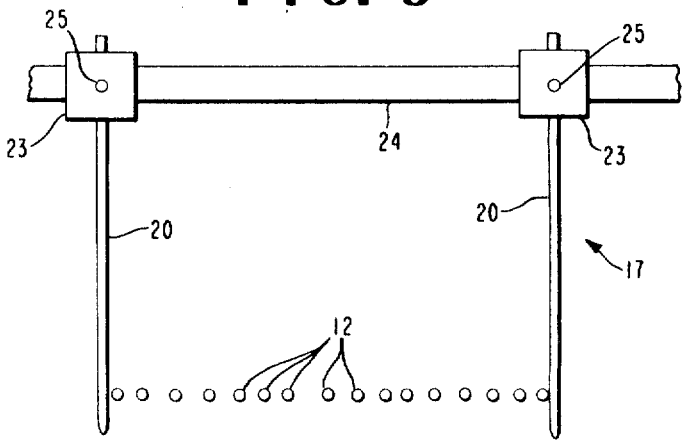

T 864,009

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 15, 1969

864 O.G. 731

785,139

STRAND COMBINING MEANS

David W. Crawford and Larry M. Talbert, Madison, Tenn., assignors to E. I. du Pont de Nemours and Company, Wilmington, Del., a corporation of Delaware

Filed Dec. 19, 1968. Published July 15, 1969
Int. Cl. D02h *13/16*
U.S. Cl. 28—1
2 Sheets Drawing. 9 Pages Specification

An apparatus for forming and combining a plurality of moving ribbons of filaments wherein is provided a fan shaped comb and a guide mounted below the comb, both engaging the filaments. Relative movement between the comb and the guide provides a means for varying the width of the ribbons. The filaments pass through the comb and then contact the guide. The depth of the filaments in the comb determines the overall width of the ribbon and is controlled by positioning the guide, positioning the comb or both.

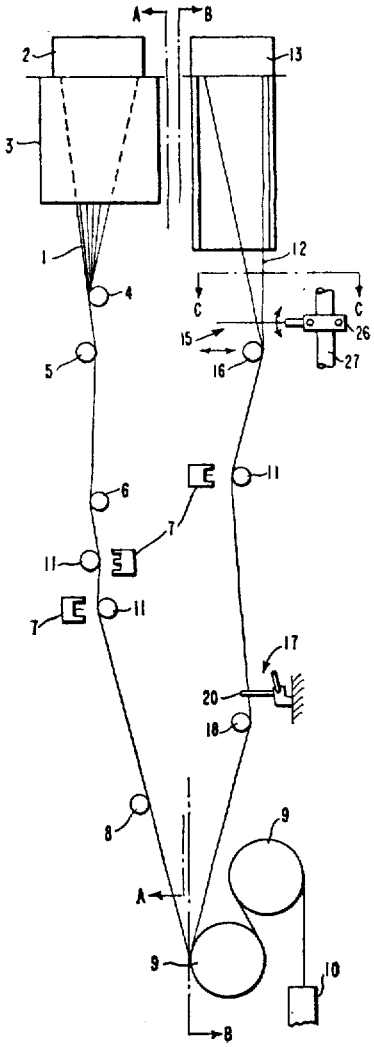

T 864,009

July 15, 1969 D. W. CRAWFORD ET AL DEF. PUB.

STRAND COMBINING MEANS SN - 785139

Filed Dec. 19, 1968 Sheet 1 of 2

INVENTORS

DAVID W. CRAWFORD

LARRY M. TALBERT

BY Howard P. West Jr

ATTORNEY

T864,009

July 15, 1969

D. W. CRAWFORD ET AL

STRAND COMBINING MEANS

DEF. PUB.
SN - 785139

Filed Dec. 19, 1968

Sheet 2 of 2

INVENTORS

DAVID W. CRAWFORD
LARRY M. TALBERT

BY Howard P. West Jr.
ATTORNEY